Dec. 14, 1954

R. M. SEVERANCE 2,696,744

TOOTH STRUCTURE FOR COUNTERSINK TOOLS

Filed May 25, 1951

Inventor
ROLLIN M. SEVERANCE

By

Attorney

United States Patent Office 2,696,744
Patented Dec. 14, 1954

2,696,744

TOOTH STRUCTURE FOR COUNTERSINK TOOLS

Rollin M. Severance, Saginaw, Mich., assignor to Severance Tool Industries, Inc., Saginaw, Mich., a corporation of Michigan Application May 25, 1951, Serial No. 228,263

5 Claims. (Cl. 77—73.5)

This invention relates to a countersink tool and particularly to a type thereof having its teeth, or blades, set in two different positions for the purpose of eliminating chattering and for the purpose of effecting rapid discharge of cut stock from the tool.

As is well known, in all kinds of machine tool operations, including de-burring, countersinking and similar operations, continually higher speeds are always being required. However, in prior practice, the speed of a countersink tool was limited by the speed with which cut stock could be discharged from between the teeth of the tool and by the speed at which chattering, or other excessive vibration, developed.

It is, therefore, a principal object of this invention to provide a countersink tool which is capable of attaining much higher speeds of operation without chattering, or other excessive vibration, than was previously possible.

A further object of the invention is to provide a countersink tool, as aforesaid, in which the cut stock may be discharged from between the teeth of the tool more rapidly than previously.

A further object of the invention is to provide a countersink tool which will be simple and economical to construct.

A further object of the invention is to provide a countersink tool, as aforesaid, which can be sharpened and kept in good operating condition simply and easily.

Further objects and purposes of the invention will become apparent to persons acquainted with apparatus of this type upon reading the following disclosure and inspection of the accompanying drawings.

General description

Figure 1:
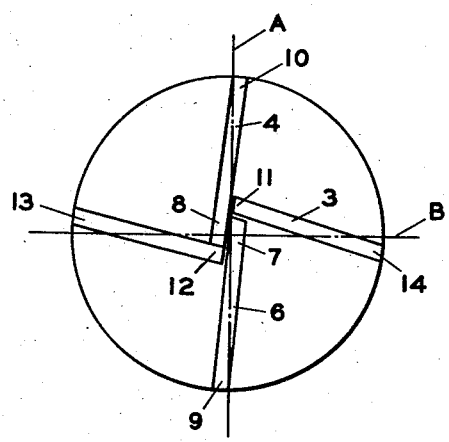
Figure 1 represents an end view of said tool taken from the blade end thereof.

In general, this tool provides one pair of substantially diametrically positioned teeth set at, or close to, one diameter of the tool, but overlapping each other sufficiently to provide a small circumferential lead for each thereof, and another pair of substantially diametrically arranged teeth positioned at approximately 90 degrees with respect to the first named pair of teeth which are positioned at a much sharper angle to the diameter of the tool on which these last named teeth are located. In this way, there are provided two separate angles of attack by the teeth with respect to the stock being cut by which there is attained the foregoing named objects.

Detailed description

Referring to the figures, there is provided a body part 1 affixed in a conventional manner to a shank 2. The teeth 3, 4, 5 and 6 are provided by cutting out material between same and thereby forming said teeth integrally with the said body part 1 in the shape and manner hereinafter described. As shown in the drawings, each of said teeth is given a positive rake.

Figure 2:
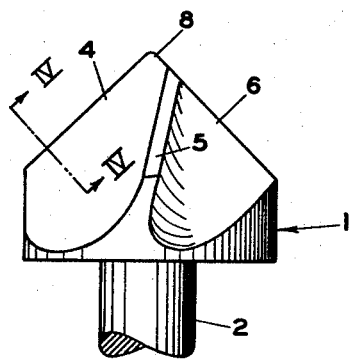
Figure 2 is a side view of the head of the tool showing one of the intermediate teeth.

The two main teeth are shown at 4 and 6. These are both cut in the shape shown in cross-section in Figure 4 and further cut so that their nose ends 7 and 8 overlap each other slightly as shown in Figure 1. The peripheral ends 9 and 10 of said teeth are positioned with respect to the common diameter indicated by the broken line "A" in Figure 1 so as to provide a slight angle between said teeth and said diameter. The nose ends 7 and 8 of said teeth are both ground into substantial register with each other so that their combined side view appears as a single angle as shown in Figure 2.

The other, or intermediate, teeth 3 and 5 have their centerward ends, or tips, 11 and 12 overlapping the nose ends 7 and 8, respectively, of the main teeth 4 and 6. Their peripheral ends 13 and 14 are set back of a reference diameter indicated by the broken line "B," line "B" here being at an angle of about 90 degrees with respect to line "A," and are thus placed at a somewhat greater angle to a diameter than are the main teeth 4 and 6. By way of example, but not as limiting, the main teeth 4 and 6 may be at an angle of from about 10 degrees to about 14 degrees with respect to the line "A" and the intermediate teeth 3 and 5 may be at an angle of from about 16 degrees to about 20 degrees with respect to the line "B." In the particular tool here utilized for disclosure purposes, the teeth 4 and 6 are at an angle of 10 degrees with respect to the line "A" and the teeth 3 and 5 are at an angle of 19 degrees with respect to the line "B." Since the intermediate teeth 3 and 5 are at a substantially greater angle to the face of the work than are the main teeth 4 and 6, they will operate on the work at a different shear angle than will the main teeth 4 and 6 and according to mutually different characteristics. This effectively prevents chattering even at high working speeds. Further, the angular positioning of each of the teeth causes the material removed to move out from the tool easily in an extended spiral and thus further facilitates speed in operation.

Figure 4:
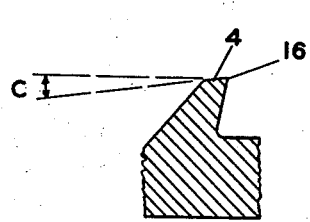
Figure 4 is a fragmentary section taken on the line IV—IV of Figure 2.
Figure 3:
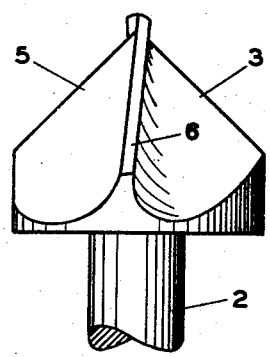
Figure 3 is a side view of the head of the tool showing one of the main teeth.

Although, as shown at 4 in Figure 4 there is preferably provided a slight back-off angle "C" of from about 5 to about 7 degrees, the leading edge 16 of all of said teeth lie in an imaginary curved surface defining a single cone. The positioning of the main teeth at a lesser angle to the diameter "A" than the positioning of the intermediate teeth 3 and 5 with respect to diameter "B" will prevent the intermediate teeth 3 and 5 from cutting too rapidly and thus stalling the tool. Thus, the two different angles of attack above mentioned are attained without introducing other undesirable factors into the operation of the tool.

The foregoing mentioned dimensional details, and the appearance in the drawings of a countersink tool whose cutting surfaces are positioned at an angle of 45 degrees with respect to the axis of the tool, are all given by way of example only and it will be apparent to persons acquainted with tools of this type that these various details of construction may be varied throughout a wide range without going beyond the scope of the invention.

I claim:

1. In a countersinking tool, the combination comprising: a body part, four conically arranged teeth extending axially from said body part and provided with a positive rake, two of said teeth being oppositely positioned with respect to each other and overlapping each other at the center of said tool and each being substantially radially disposed at an angle of from about 10 degrees to about 14 degrees with respect to a first diameter through said teeth, and the two other teeth of said tool being oppositely positioned with respect to each other and substantially radially arranged at an angle of from about 16 degrees to about 20 degrees with respect to a second diameter of said tool, said second diameter being positioned at an angle of about 90 degrees with respect to said first diameter, and said last two named teeth overlapping the centermost ends of said first two named teeth.

2. The tool defined in claim 1 wherein the cutting edges of all of said teeth lie in an imaginary surface defining a single cone.

3. In a countersinking tool the combination including: a body part; a plurality of conically arranged teeth extending axially from said body part, each of said teeth being provided with a positive rake, and alternate teeth having a corresponding and substantially oppositely positioned tooth, the leading edges of which overlap at the center of the tool, each tooth being substantially radially disposed at an angle to a diameter passing through said teeth; teeth intermediate said alternate teeth being substantially oppositely positioned and parallel but offset from each other arranged to overlap the end of one of said alternate teeth and to abut the other of said alternate teeth and disposed at a greater angle to a radial line passing through the center of said tool than said alternate teeth.

4. The tool defined in claim 3 wherein the radial lines passing through the intermediate teeth are positioned so as to form a diameter at an angle of ninety degrees to said first mentioned diameter at the center of said tool.

5. In a countersinking tool the combination comprising: a body part; four conically arranged teeth extending axially from said body part and provided with a positive rake, two of said teeth being oppositely positioned with respect to each other and overlapping each other at the center of said tool and each being at an angle to a first diameter through said teeth, and two other teeth being oppositely positioned and parallel but offset with respect to each other and disposed at a greater angle to a second diameter perpendicular to the first said diameter and overlapping the centermost ends of said first two teeth.

References Cited in the file of this patent

UNITED STATES PATENTS

| Number | Name | Date |
|---|---|---|
| 984,323 | Vauclain | Feb. 14, 1911 |
| 2,401,307 | Manewich | June 4, 1946 |